No. 779,167. PATENTED JAN. 3, 1905.
J. W. KERWIN.
STEREOTYPE CUTTING MACHINE.
APPLICATION FILED DEC. 24, 1903.
7 SHEETS—SHEET 4.
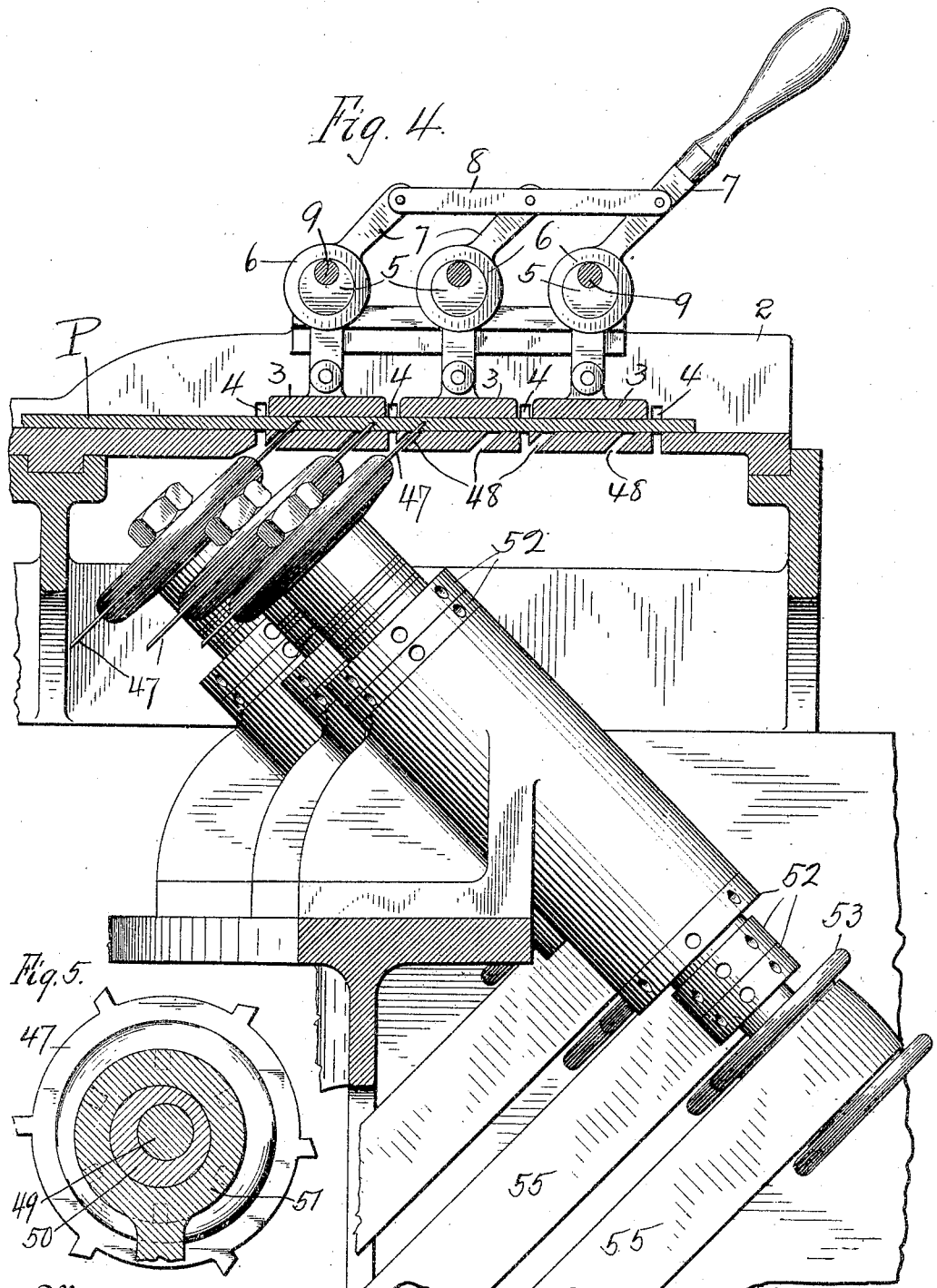

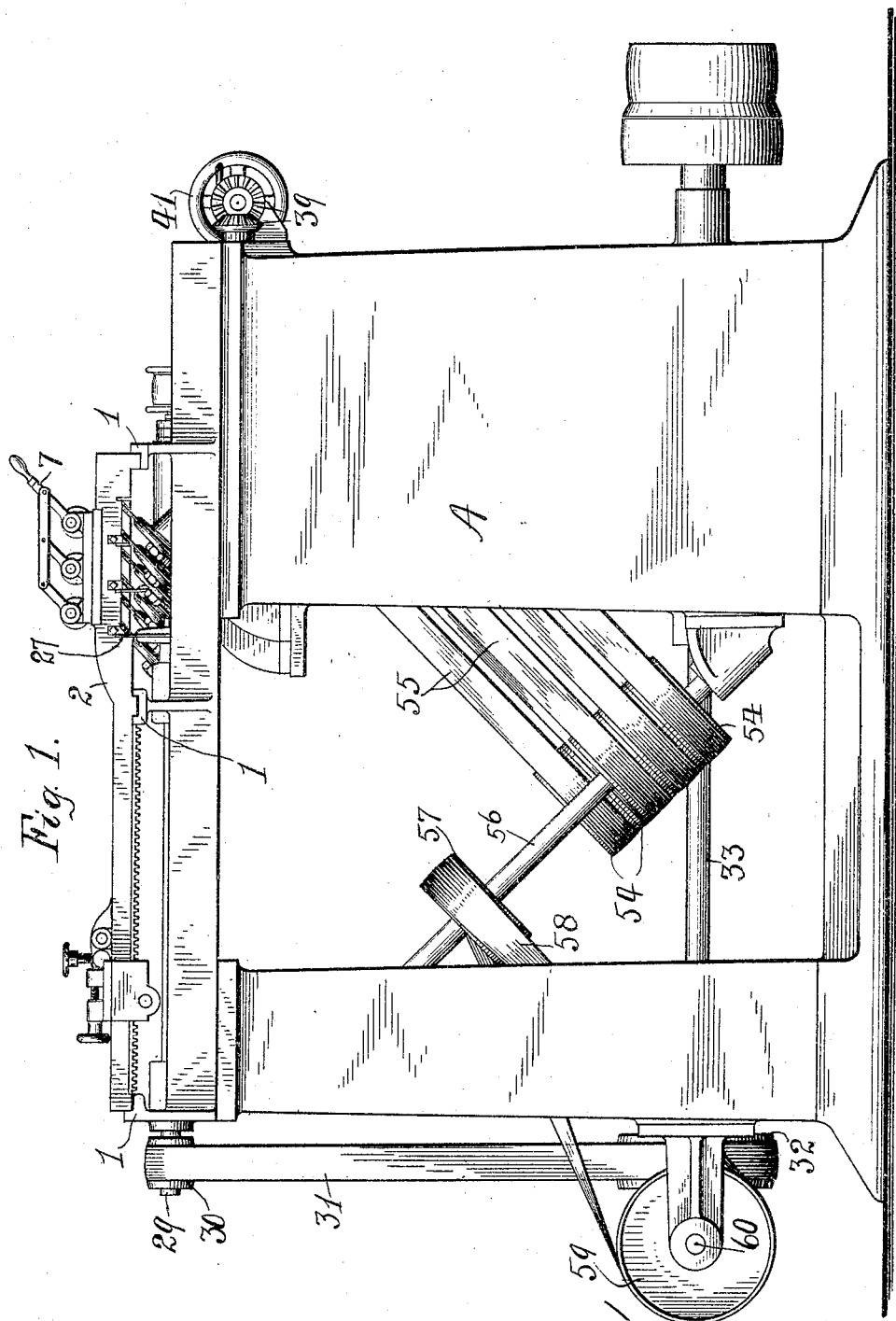

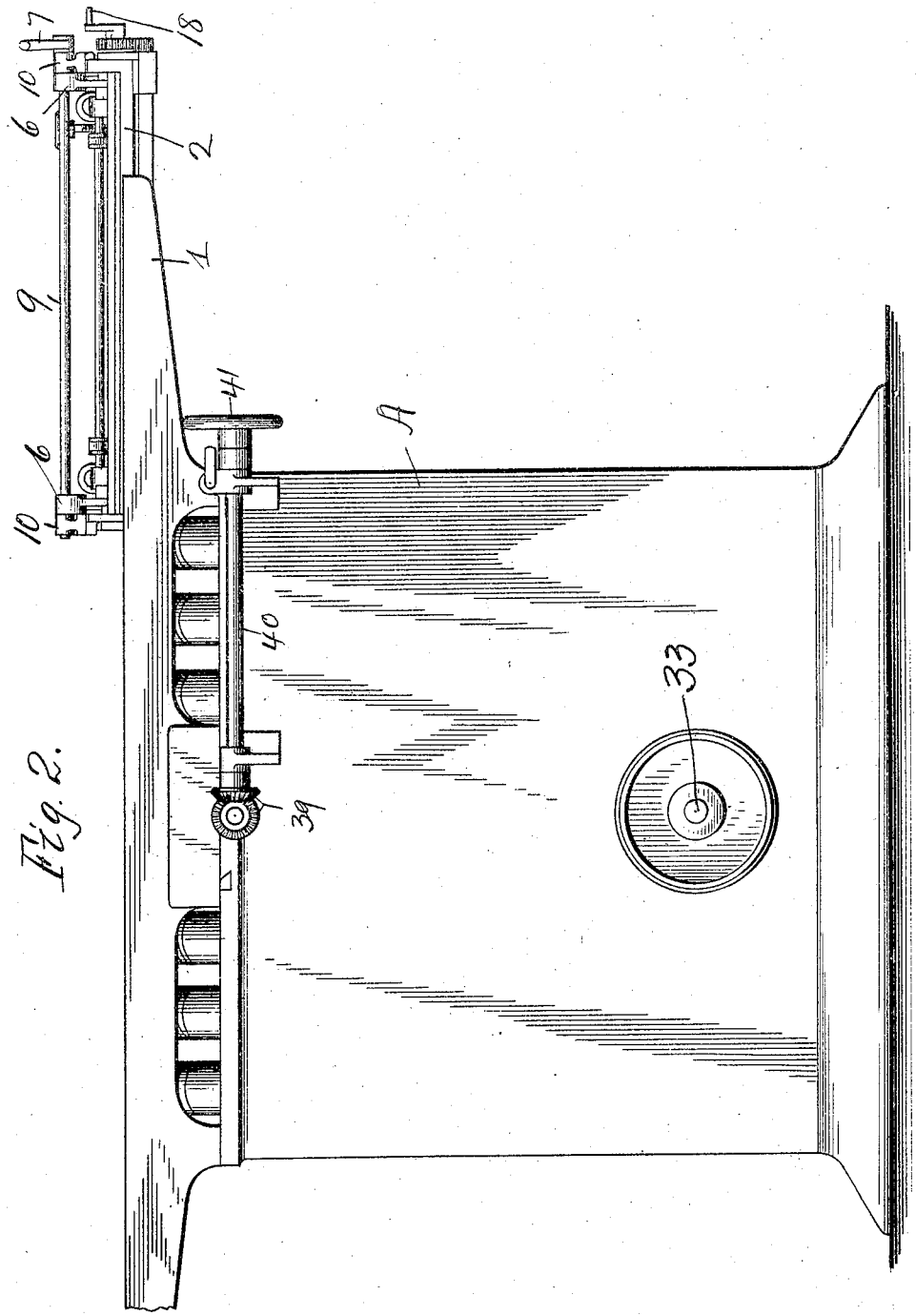

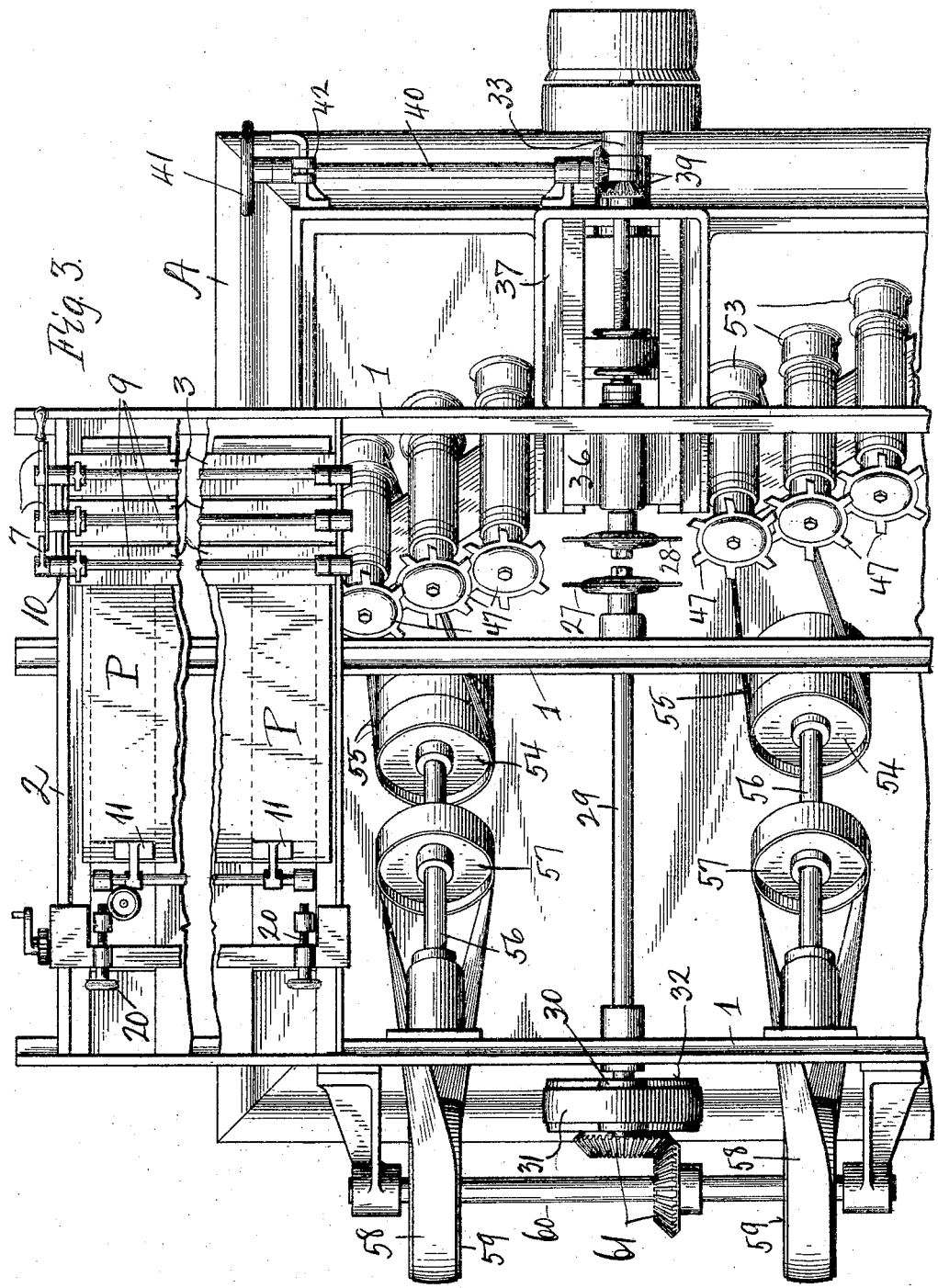

No. 779,167. PATENTED JAN. 3, 1905.
J. W. KERWIN.
STEREOTYPE CUTTING MACHINE.
APPLICATION FILED DEC. 24, 1903.
7 SHEETS—SHEET 5.
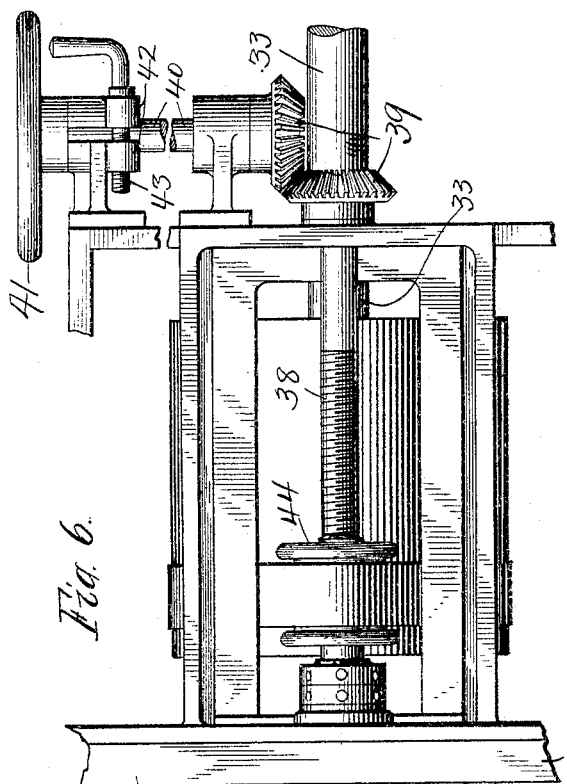
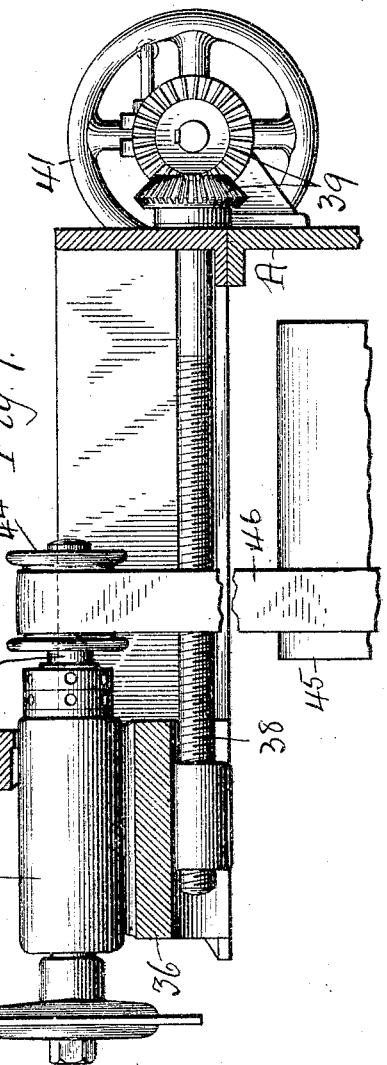
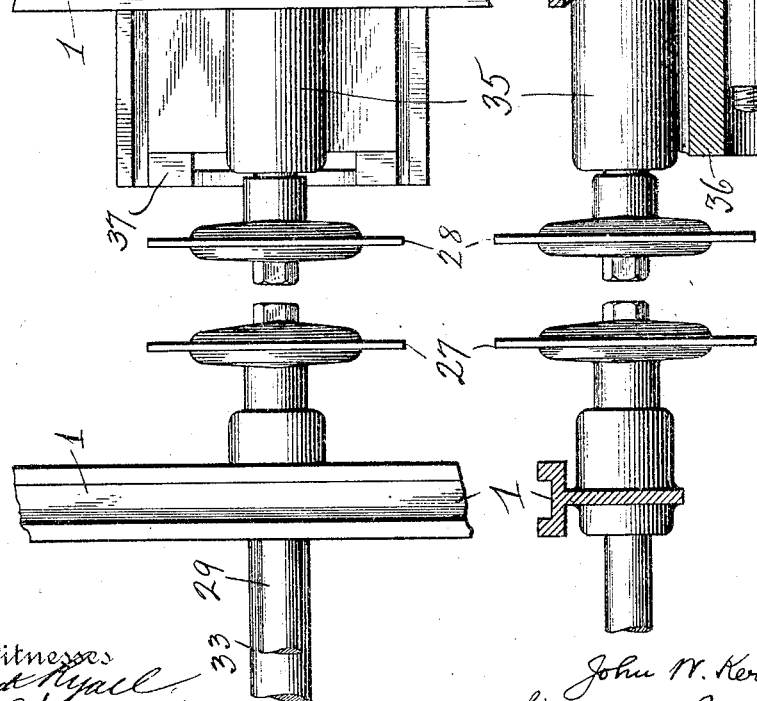
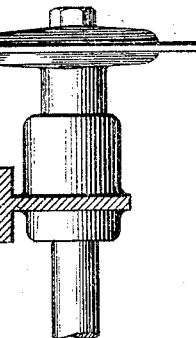
Witnesses
Inventor
John W. Kerwin,
By his Attorney Richard W. Barkley.

No. 779,167. PATENTED JAN. 3, 1905.
J. W. KERWIN.
STEREOTYPE CUTTING MACHINE.
APPLICATION FILED DEC. 24, 1903.
7 SHEETS—SHEET 6.
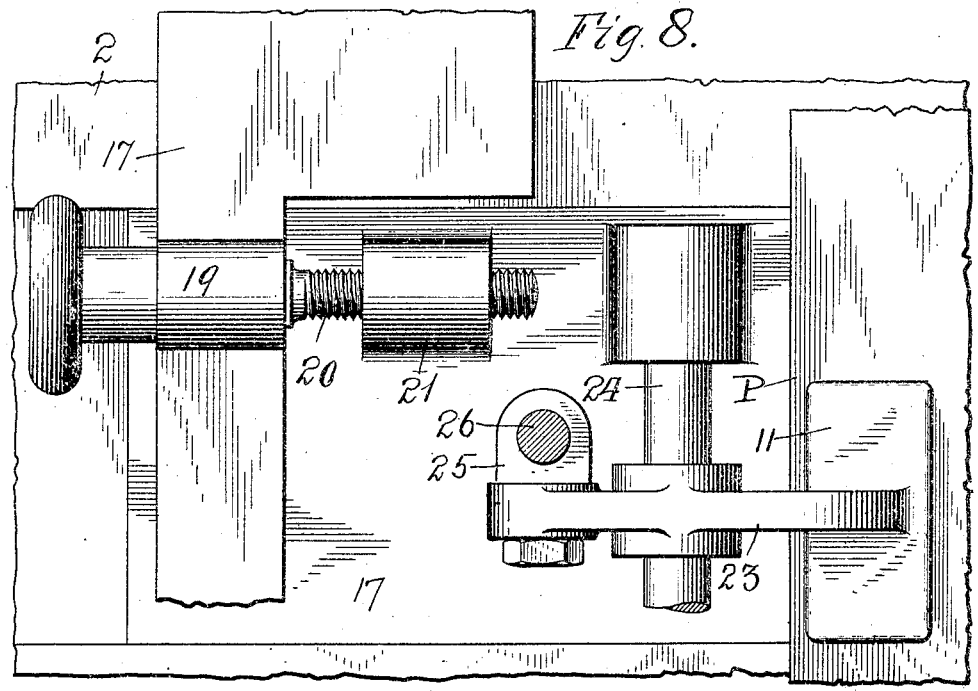
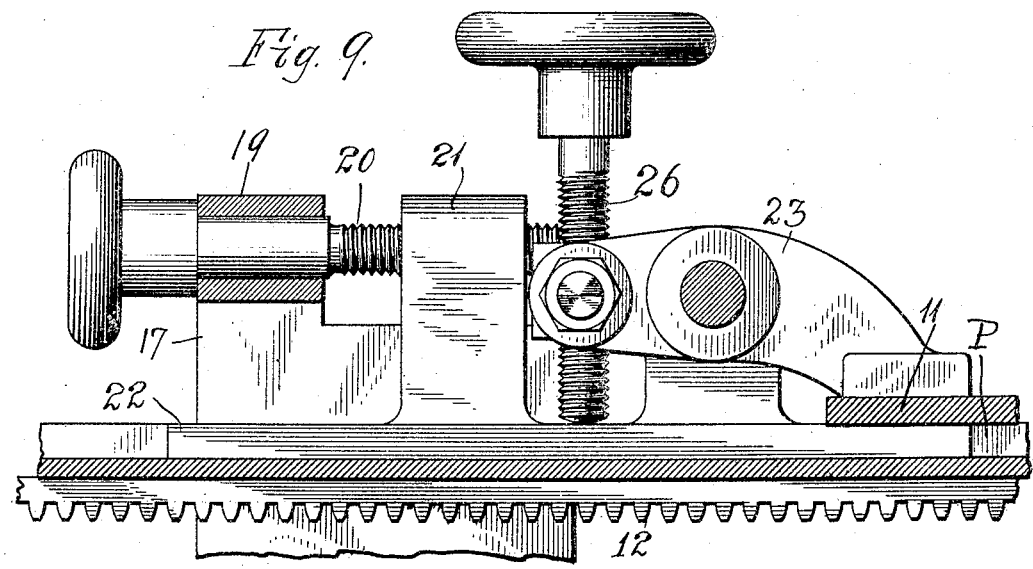

No. 779,167. PATENTED JAN. 3, 1905.
J. W. KERWIN.
STEREOTYPE CUTTING MACHINE.
APPLICATION FILED DEC. 24, 1903.
7 SHEETS—SHEET 7.
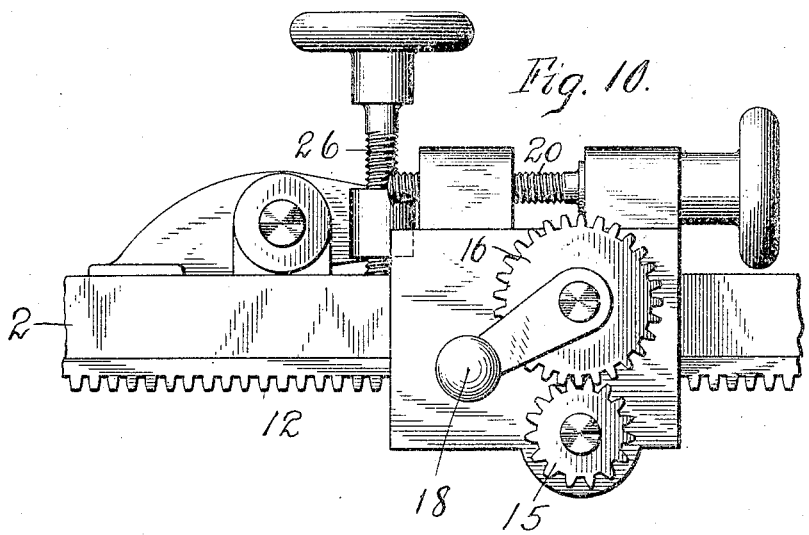
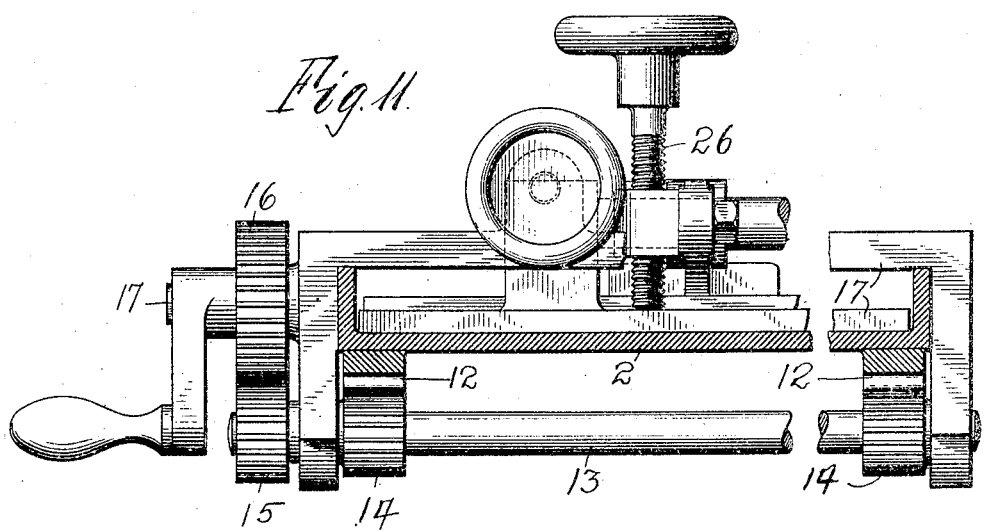

No. 779,167.

Patented January 3, 1905.

UNITED STATES PATENT OFFICE.

JOHN W. KERWIN, OF FLUSHING, NEW YORK, ASSIGNOR TO AMERICAN PRESS ASSOCIATION, A CORPORATION OF NEW YORK.

STEREOTYPE-CUTTING MACHINE.

SPECIFICATION forming part of Letters Patent No. 779,167, dated January 3, 1905.

Application filed December 24, 1903. Serial No. 186,479.

*To all whom it may concern:*

Be it known that I, JOHN W. KERWIN, a citizen of the United States, and a resident of Flushing, in the county of Queens and State of New York, have invented a certain new and useful Improvement in Stereotype-Cutting Machines, of which the following is a specification.

This invention relates more particularly to mechanism for cutting stereotype-plates into strips or columns and for cutting oblique grooves therein; and it consists of features of construction and combinations of devices hereinafter described, and more particularly pointed out in the appended claims.

One form of the invention is illustrated in the accompanying drawings, forming part hereof, in which—

Figure 1 is a rear elevation. Fig. 2 is a side elevation. Fig. 3 is a plan view, partly broken away. Fig. 4 is a side view, on a larger scale, of parts shown in Fig. 3. Fig. 5 is a detail. Fig. 6 is a plan, and Fig. 7 is a side view, on a larger scale, of devices shown in Fig. 3. Figs. 8 and 9 are detail views of clamping mechanism. Figs. 10 and 11 are respectively end and side views of parts shown in Figs. 1, 2, and 3.

Referring to the drawings, the reference A marks a suitable framework, in which the moving parts are mounted in manners appropriate thereto.

The reference 1 marks ways or rails on which a plate-carrier 2 moves or slides, the plate being marked P.

The reference 3 designates clamping-bars adapted to bear upon the plate P between slots 4 in the carrier 2, said clamping-bars being actuated and held in any suitable manner, as by cams or eccentrics 5 and their straps 6, the straps 6 being pivotally connected with the clamp-bars 3. The eccentrics 5 are provided with arms or levers 7, connected together by a link 8, whereby they are operated simultaneously. The cams 5 are fast on rods 9, which are journaled in suitable bearings 10 on the carrier 2.

11 designates clamp-bars which are adjustable toward and from the clamp-bars 3. A suitable means for moving and adjusting said bars 11 along the carrier 2 is shown more in detail in Figs. 8 to 11, inclusive, and consists of racks 12, a transverse shaft 13, having pinions 14 thereon which mesh with the said racks 12, a pinion 15 on said shaft 13, with which meshes a gear 16, journaled on a stud on a traveler 17, and a crank 18 for operating the driver 16. The traveler 17 has ears 19, in which are swiveled screws 20, and these screws engage with threaded holes in lugs 21, which rise from a plate 22, which lies upon the carrier 2 and which has a straight edge which forms a stop for one edge of the plate P. The traveler 17 and plate 22 overlie the carrier 2, and the shaft 13 is beneath the carrier 2, whence it follows that the traveler, &c., may move along the carrier toward and from the clamps 3, but cannot rise therefrom. The plates 11 are carried by arms or levers 23, which are fast to or are fulcrumed on a shaft 24, which may be journaled in risers on the plate 22. The levers 23 are provided with arms 25, which are journaled in the ends of said levers. Screws 26 engage with threaded holes in the arms 25. Their lower ends bear against the plate 22, and their upper ends are provided with hand-wheels or other means whereby they may be operated to cause the plates 11 to press plate P against the carrier 2 and to loosen said plates 11.

Two saws 27 28 are provided for the purpose of splitting plates into strips, sections, or columns, the number of columns in a strip or section depending upon the position of the plate P on the carrier 2 or upon the position of the saw 28, or both. The saw 27 is fast upon a shaft 29, which is journaled in the frame A and has a belt-pulley 30 fast thereon. The pulley 30 is driven by a belt 31 from a pulley 32, which is fast on the main drive-shaft 33, which may be provided with the usual fast and loose pulleys. The saw 28 is fast on a shaft 34, which is journaled in a bearing 35 on a movable plate or carriage 36. (See Figs. 3, 6, and 7.) The carriage 36 slides on ways or guides 37, which form part of the frame A, being moved to and fro and held in any position along said guides by means of a screw 38, which is rotatable, but is not longitudinally movable in bearings on the frame A. The screw 38 may be operated by any suitable means, as by means of bevel-gears 39, a shaft 40, on which one of said bevel-gears is fast, the other being fast on the shaft of the screw 38, and a hand-wheel 41 on the shaft 40. The shaft 40 may be held against undesired rotation in any suitable way, as by means of a split collar 42 and a screw 43 for operating said split-bearing. The shaft 34 has a belt-pulley 44 fast thereon, and the shaft 34 has a wide pulley 45 fast thereon, and a belt 46 runs on said pulleys 44 45 and drives the saw 28. (It is noted that in Fig. 7 the pulley 45 is higher than it is in other figures of the drawings, this view being diagrammatic in that respect.) The saws 27 28 pass through the grooves 4 in the carrier 2 in order to reach the plate P, as will be understood, and split the said plate along the column-rules.

By having more than two grooves 4 in the carrier 2 and by adjusting the position of the saw 28 so that it will extend through one or another of the said grooves 4 plates of one or more column widths may be severed from the complete plate.

The stereotype-plate P may be what is known as a "shell-plate," or one which is fastened to a base before being used in the printing-press, in which case it is to be provided with holddowns, such as oblique grooves in its under side, which engage with oblique ribs on the base. For the purpose of forming oblique grooves in the under side of the plate two gangs of oblique saws 47 are shown in the drawings, (see more particularly Fig. 4,) the bed of the carrier 2 being slotted obliquely at 48 to allow the saws 47 to pass through and cut the plate P. The saws 47 are fast on shafts 49, which, by preference, are journaled in eccentric bushings or sleeves 50, whereby their height may be varied to cause the saws 47 to cut deeper or shallower grooves in the plate P. The bushings 50 are held in bearings 51, which form part of the main frame of the machine and may be held in adjusted positions by any suitable means, as by means of capstan-nuts 52, which engage with threaded ends of the bushings and bear against the ends of the bearings 51, as will be understood. The shafts 49 have belt-pulleys 53 fast thereon, which are driven from pulleys 54 by belts 55. The pulleys 54 are fast on shafts 56, which are placed obliquely or at an inclination to the horizontal in the machine and are provided with other pulleys 57, on which run the belts 58. The belts 58 run on and are driven by pulleys 59, which are fast on a shaft 60. The shaft 60 is connected by bevel-gears 61 with the main drive-shaft 33.

In the operation of the machine the plate P is clamped down to the carrier 2 by means of the clamping-bars 3 and the plates 11 in such wise that the column rules or spaces lie directly over the said grooves 4. The saw 28 may be moved into position for trimming the edge (shown at the right in Fig. 3) by means of the hand-wheel 41 and the screw 38, while the carrier 2 is moved along the rails 1. The saw 27 is set to cut through the plate P at the third column-rule when the plate is in the position shown in Fig. 3, while saw 28 may be set to trim the edge, as above stated, or at either the first or second column-rule. Obviously the saw 27 may be used to trim the edge of the plate P, if desired. At the same time that the saws 27 28 sever the plate P into strips, sections, or columns the saws 47 groove the plate on the under side at the proper places, so that when the strips, sections, or columns are placed upon a corresponding base (not shown) the grooves formed by the saws 47 will engage with the oblique ribs or holddowns of such base.

While I have shown in the drawings and have described above the preferred form of my invention, it is to be understood that I do not limit myself to the precise arrangements shown and described, but that the invention is capable of modification in many ways without departing from the spirit thereof.

What is claimed as new is—

1. In a plate-cutting machine, the combination of a movable plate-carrier provided with more than two through-grooves therein, with two saws, and means for adjusting the position of at least one of said saws with relation to said grooves.

2. In a plate-cutting machine, the combination with a saw, of an eccentric-sleeve bearing for its shaft or axis, and means for allowing of the rotation of said sleeve and for locking it against rotation.

3. In a plate-cutting machine, the combination of a to-and-fro movable plate-carrier provided with parallel through-grooves therein, splitting-saws extending through said grooves and splitting the plate into strips or sections, and parallel plate-clamping bars arranged between said grooves for holding said sections.

4. In a plate-cutting machine, the combination of a to-and-fro movable plate-carrier, racks thereon, a traveler thereover, a shaft and pinions thereon, said shaft being journaled on said traveler and said pinions meshing with said racks, and clamping means carried by said traveler for holding the plate on said carrier.

5. In a plate-cutting machine, the combination of a to-and-fro movable plate-carrier provided with parallel through-grooves therein, saws passing through said grooves, vertically-movable clamping-bars parallel with and some between said grooves, a traveler on said carrier movable toward and from said clamp-bar, and a clamp device on said traveler for holding the plate on said carrier.

6. In a plate-cutting machine, the combination with a to-and-fro movable plate-carrier, of a two-part traveler thereon having one member lying on said carrier and forming a stop for one edge of the plate to be cut, adjustable means for connecting the parts of said traveler, and means for moving said traveler along said carrier.

Signed at New York city, in the county of New York and State of New York, this 3d day of December, A. D. 1903.

JOHN W. KERWIN.

Witnesses:
RICHARD W. BARKLEY,
EDITH J. GRISWOLD.